US012613999B2

(12) United States Patent
Regner

(10) Patent No.: US 12,613,999 B2
(45) Date of Patent: Apr. 28, 2026

(54) DETECTING ELECTRONIC SYSTEM MODIFICATION

(71) Applicant: International Business Machines Corporation, Armonk, NY (US)

(72) Inventor: Kurt William Regner, Mesquite, TX (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 16/451,375

(22) Filed: Jun. 25, 2019

(65) Prior Publication Data

US 2020/0411047 A1 Dec. 31, 2020

(51) Int. Cl.
| | |
|---|---|
| *G06F 21/64* | (2013.01) |
| *G01N 21/359* | (2014.01) |
| *G01N 21/64* | (2006.01) |
| *G09B 29/12* | (2006.01) |
| *G11B 20/00* | (2006.01) |
| *H04L 9/32* | (2006.01) |

(52) U.S. Cl.
CPC ........... *G06F 21/64* (2013.01); *G01N 21/359* (2013.01); *G01N 21/645* (2013.01); *G09B 29/12* (2013.01); *G11B 20/00898* (2013.01); *H04L 9/3263* (2013.01)

(58) Field of Classification Search
None
See application file for complete search history.

(56) References Cited

U.S. PATENT DOCUMENTS

| | | | |
|---|---|---|---|
| 4,633,504 A | 12/1986 | Wihl | |
| 5,014,230 A | 5/1991 | Sinha et al. | |
| 5,267,324 A | 11/1993 | Kumagai | |
| (Continued) | | | |

FOREIGN PATENT DOCUMENTS

| | | | | |
|---|---|---|---|---|
| EP | 1971102 A1 * | 9/2008 | ............. | G06F 21/55 |
| EP | 3396625 A1 | 10/2018 | | |
| (Continued) | | | | |

OTHER PUBLICATIONS

F. Courbon, P. Loubet-Moundi, J. J. A. Fournier and A. Tria, "SEMBA: a Sem based acquisition technique for fast invasive Hardware Trojan detection," 2015 European Conference on Circuit Theory and Design (ECCTD), 2015, pp. 1-4, doi: 10.1109/ECCTD.2015.7300097.*

(Continued)

*Primary Examiner* — Syed A Zaidi
*Assistant Examiner* — Vadim Savenkov
(74) *Attorney, Agent, or Firm* — Seed Intellectual Property Law Group LLP

(57) ABSTRACT

Embodiments are disclosed for techniques to detect electronic system modification. The techniques include causing an electronic system to perform a predetermined set of routines. The techniques also include generating field scans of the electronic system while the predetermined set of routines is performed. The techniques further include comparing the field scans to baseline scans of the electronic system. Additionally, the techniques include determining that one of the field scans and one of the baseline scans are different. Further, the techniques include identifying at least one difference between the one field scan and the one baseline scan.

16 Claims, 9 Drawing Sheets

(56) References Cited

U.S. PATENT DOCUMENTS

| | | | | |
|---|---|---|---|---|
| 5,613,014 | A | 3/1997 | Eshera et al. | |
| 5,631,971 | A | 5/1997 | Sparrow | |
| 6,223,272 | B1* | 4/2001 | Coehlo | G06F 11/261 |
| | | | | 714/E11.167 |
| 6,557,102 | B1* | 4/2003 | Wong | G06F 21/608 |
| | | | | 713/176 |
| 6,885,191 | B1 | 4/2005 | Gleman | |
| 7,157,714 | B2 | 1/2007 | Del Grande | |
| 7,369,236 | B1 | 5/2008 | Sali et al. | |
| 7,902,507 | B1* | 3/2011 | Garvey, III | G01J 5/0265 |
| | | | | 250/330 |
| 7,965,894 | B2 | 6/2011 | Tian et al. | |
| 8,374,438 | B1* | 2/2013 | Wagner | G06T 7/001 |
| | | | | 382/209 |
| 8,457,367 | B1 | 6/2013 | Sipe et al. | |
| 8,464,059 | B2 | 6/2013 | Richardson et al. | |
| 8,744,133 | B1* | 6/2014 | Troy | G06T 7/001 |
| | | | | 382/106 |
| 9,418,079 | B2 | 8/2016 | Zuccarino et al. | |
| 9,449,582 | B2 | 9/2016 | Padgett | |
| 9,470,520 | B2 | 10/2016 | Schwarz et al. | |
| 9,647,846 | B1* | 5/2017 | Schulman | G06F 21/56 |
| 9,893,898 | B2 | 2/2018 | Kreft | |
| 9,906,544 | B1* | 2/2018 | Kurupati | H04L 63/1416 |
| 10,060,973 | B1* | 8/2018 | Helinski | G01R 31/2884 |
| 10,129,035 | B2 | 11/2018 | Gulati et al. | |
| 10,235,523 | B1* | 3/2019 | Keller, III | G06F 13/4282 |
| 10,284,574 | B1* | 5/2019 | Aziz | G06F 9/00 |
| 10,372,587 | B1* | 8/2019 | Sternberg | G06F 21/755 |
| 10,467,504 | B1* | 11/2019 | Hamedi | G06F 18/22 |
| 11,489,847 | B1* | 11/2022 | Uplinger, II | H04L 63/1441 |
| 2001/0055415 | A1 | 12/2001 | Nozaki | |
| 2002/0040466 | A1* | 4/2002 | Khazei | G06F 30/367 |
| | | | | 716/115 |
| 2007/0198861 | A1* | 8/2007 | Minami | G06F 21/57 |
| | | | | 713/181 |
| 2010/0318515 | A1* | 12/2010 | Ramanathan | G06F 16/41 |
| | | | | 707/723 |
| 2012/0180126 | A1* | 7/2012 | Liu | G06F 21/81 |
| | | | | 726/22 |
| 2012/0226463 | A1* | 9/2012 | Keller, III | G01R 31/2837 |
| | | | | 702/117 |
| 2013/0019324 | A1* | 1/2013 | Tehranipoor | H03K 3/0315 |
| | | | | 726/34 |
| 2013/0148883 | A1 | 6/2013 | Lee | |
| 2013/0318607 | A1* | 11/2013 | Reed | G06F 11/3062 |
| | | | | 726/23 |
| 2013/0336573 | A1* | 12/2013 | Dalla-Torre | G06T 7/001 |
| | | | | 382/145 |
| 2016/0091370 | A1* | 3/2016 | Schnaare | G01M 99/00 |
| | | | | 702/183 |
| 2016/0098561 | A1* | 4/2016 | Keller | G06F 21/554 |
| | | | | 726/24 |
| 2016/0112083 | A1* | 4/2016 | Keller, III | H01L 23/66 |
| | | | | 375/316 |
| 2016/0148365 | A1* | 5/2016 | Tsuda | F27B 1/16 |
| | | | | 382/141 |
| 2016/0284073 | A1* | 9/2016 | Michalscheck | G06T 7/001 |
| 2016/0292846 | A1* | 10/2016 | Sprock | G06T 7/001 |
| 2016/0349314 | A1* | 12/2016 | Dubrova | G01R 31/318385 |
| 2017/0126704 | A1* | 5/2017 | Nandha Premnath | |
| | | | | H04L 63/145 |
| 2017/0374296 | A1* | 12/2017 | Schmidt | G06T 7/001 |
| 2018/0006830 | A1* | 1/2018 | Cambou | G06F 21/00 |
| 2018/0027003 | A1* | 1/2018 | Bahgat Shehata | H04L 63/162 |
| | | | | 726/23 |
| 2018/0204002 | A1* | 7/2018 | Khorrami | G06F 21/554 |
| 2018/0356350 | A1* | 12/2018 | Crear | G05D 9/12 |
| 2019/0057169 | A1* | 2/2019 | Santarone | G06T 19/006 |
| 2019/0066292 | A1* | 2/2019 | Pomeranz | G06T 7/0004 |
| 2019/0080063 | A1* | 3/2019 | Rice | G06N 5/003 |
| 2019/0212760 | A1* | 7/2019 | Tiwari | G06Q 10/08 |
| 2019/0238762 | A1* | 8/2019 | Coppock | G07C 5/0816 |
| 2019/0339159 | A1* | 11/2019 | Israelsen | H04N 5/33 |
| 2019/0362070 | A1* | 11/2019 | Abbaszadeh | G06F 21/554 |
| 2020/0090325 | A1* | 3/2020 | Tehranipoor | G06T 7/0008 |
| 2020/0104497 | A1* | 4/2020 | Crouch | G06F 21/76 |
| 2020/0175171 | A1* | 6/2020 | Rieger | H04L 63/1416 |
| 2020/0200692 | A1* | 6/2020 | Wang | G01N 25/72 |
| 2020/0310396 | A1* | 10/2020 | Gross | G05B 23/0254 |
| 2020/0380663 | A1* | 12/2020 | Ishida | G06T 7/75 |
| 2020/0387601 | A1* | 12/2020 | Schat | G06F 11/349 |

FOREIGN PATENT DOCUMENTS

| | | | | | |
|---|---|---|---|---|---|
| WO | WO-02084939 | A1 * | 10/2002 | | G06F 21/52 |
| WO | 2003054779 | A2 | 7/2003 | | |
| WO | 2006013384 | A1 | 2/2006 | | |
| WO | WO-2012123400 | A1 * | 9/2012 | | G09C 1/00 |
| WO | 2017059297 | A1 | 4/2017 | | |
| WO | WO-2017095862 | A1 * | 6/2017 | | G01N 21/47 |
| WO | 2018050644 | A1 | 3/2018 | | |
| WO | WO-2019075399 | A1 * | 4/2019 | | G06F 11/0793 |
| WO | WO-2019090362 | A1 * | 5/2019 | | B23D 59/001 |

OTHER PUBLICATIONS

G. Shen, Y. Tang, S. Li, J. Chen and B. Yang, "A general framework of Hardware Trojan detection: Two-level temperature difference based thermal map analysis," 2017 11th IEEE International Conference on Anti-counterfeiting, Security, and Identification (ASID), 2017, pp. 172-178, doi: 10.1109/ICASID.2017.*

K. Hu, A. N. Nowroz, S. Reda and F. Koushanfar, "High-sensitivity hardware Trojan detection using multimodal characterization," 2013 Design, Automation & Test in Europe Conference & Exhibition (Date), 2013, pp. 1271-1276, doi: 10.7873/DATE.2013.263.*

A. N. Nowroz, K. Hu, F. Koushanfar and S. Reda, "Novel Techniques for High-Sensitivity Hardware Trojan Detection Using Thermal and Power Maps," in IEEE Transactions on Computer-Aided Design of Integrated Circuits and Systems, vol. 33, No. 12, pp. 1792-1805, Dec. 2014, doi: 10.1109/TCAD.2014.2354293.*

S. Skorobogatov, "Using Optical Emission Analysis for Estimating Contribution to Power Analysis," 2009 Workshop on Fault Diagnosis and Tolerance in Cryptography (FDTC), 2009, pp. 111-119, doi: 10.1109/FDTC.2009.39.*

Jianqi Chen and Benjamin Carrion Schafer. 2019. Thermal Fingerprinting of FPGA Designs through High-Level Synthesis. In Proceedings of the 2019 on Great Lakes Symposium on VLSI (GLSVLSI '19). Association for Computing Machinery, New York, NY, USA, 331-334. https://doi.org/10.1145/3299874.3318030.*

Spiegel, "Documents Reveal Top NSA Hacking Unit", Spiegel Online, Dec. 29, 2013, 6 pages http://www.spiegel.de/international/world/the-nsa-uses-powerful-toolbox-in-effort-to-spy-on-global-networks-a-940969-3.html.

Unknown, "(U) Stealthy Techniques Can Crack Some of SIGINT's Hardest Targets", Jun. 2010, 2 pages http://www.spiegel.de/media/media-35669.pdf.

Simpson, C., "The NSA Intercepts Laptops Purchased Online to Install Malware", The Atlantic, Dec. 29, 2013, 7 pages, https://www.theatlantic.com/technology/archive/2013/12/nsa-intercepts-laptops-purchased-online-install-malware/356548/.

Gallagher, S., "Photos of an NSA "upgrade" factory show Cisco router getting implant", May 14, 2014, 4 pages https://arstechnica.com/tech-policy/2014/05/photos-of-an-nsa-upgrade-factory-show-cisco-router-getting-implant/.

Unknown, "Cisco Shipping Equipment to Fake Addresses to Foil NSA Interception", Schneier on Security, printed Mar. 7, 2019, 14 pages, https://www.schneier.com/blog/archives/2015/03/cisco_shipping_.html.

Robertson et al., "The Big Hack: How China Used a Tiny Chip to Infiltrate U.S. Companies", Oct. 4, 2018, 36 pages, https://www.bloomberg.com/news/features/2018-10-04/the-big-hack-how-china-used-a-tiny-chip-to-infiltrate-america-s-top-companies.

Mell et al., "The NIST Definition of Cloud Computing", Recom-

(56) References Cited

OTHER PUBLICATIONS mendations of the National Institute of Standards and Technology,
Sep. 2011, 7 pages.

* cited by examiner

100

202-SF
MOTHERBOARD

DETECTING ELECTRONIC SYSTEM MODIFICATION

BACKGROUND

The present invention relates to electronic system modification, and more specifically, to detecting electronic system modification.

An electronic system can include various types of electronics, such as a computer, the modular subsystems of a computer, or a network appliance, such as a switch, router, firewall, load balancer, and the like. Electronic system modification can be a change to the hardware and/or software components of the electronic system. Such modification can result from tampering, which can be a tool for the malicious use of such systems.

SUMMARY

Embodiments are disclosed for techniques to detect electronic system modification. The techniques include causing an electronic system to perform a predetermined set of routines. The techniques also include generating field scans of the electronic system while the predetermined set of routines is performed. The techniques further include comparing the field scans to baseline scans of the electronic system. Additionally, the techniques include determining that one of the field scans and one of the baseline scans are different. Further, the techniques include identifying at least one difference between the one field scan and the one baseline scan.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2B depicts a block diagram of an example subtractive filtered motherboard, in accordance with embodiments of the present disclosure.

FIG. 6 depicts a block diagram of an example modification detector, in accordance with embodiments of the present disclosure.

Figure 1:
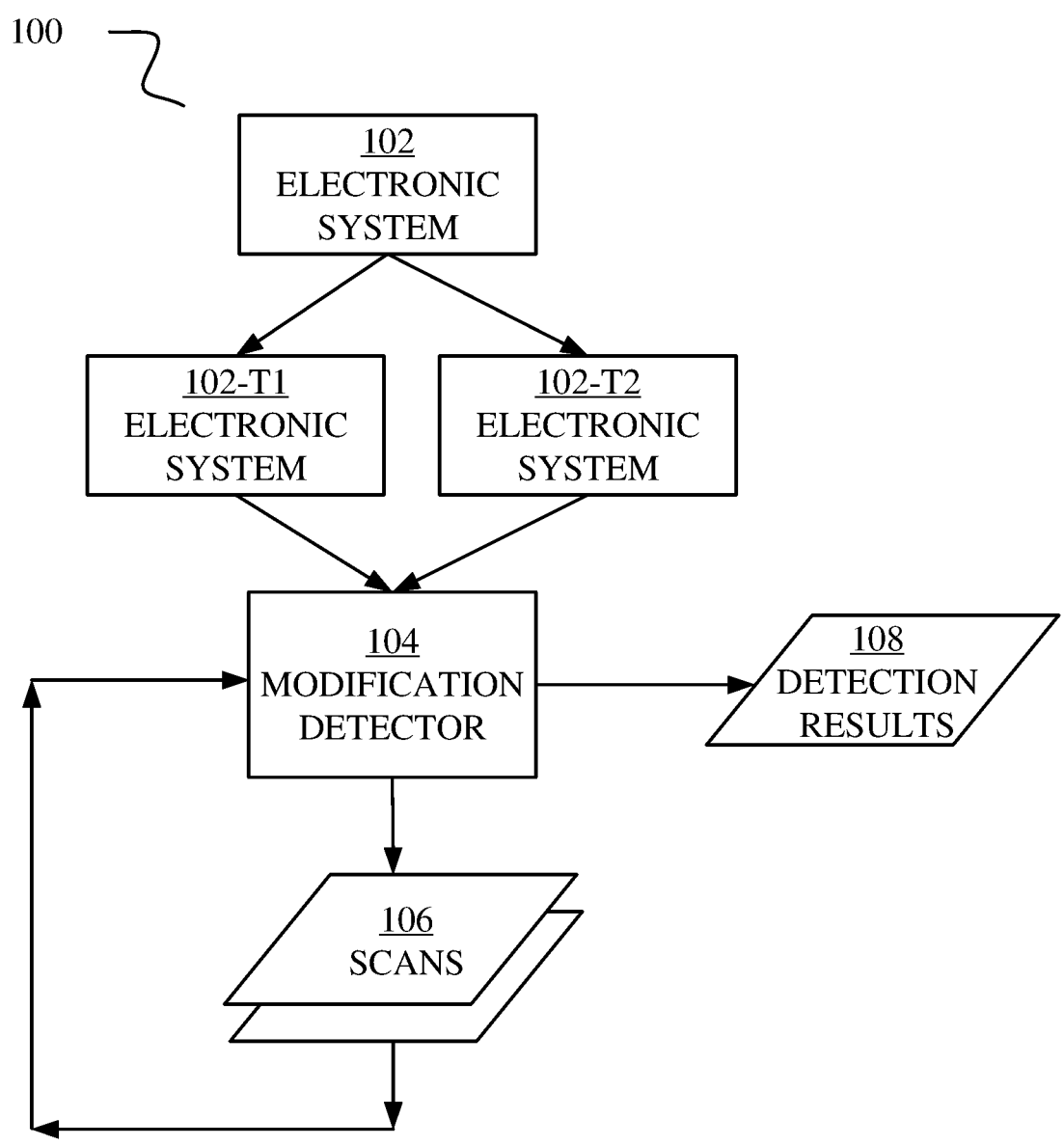
FIG. 1 depicts a block diagram of a system for detecting electronic system modification, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Tampering with electronic systems can involve replacing the hardware or microcode components of the electronic system, modifying the electronic system, adding components to the electronic system, removing components from the electronic system, and the like. Malicious actors can tamper with electronic systems between the time of manufacture and sale, use, etc. Malicious actors can include individuals, activist organizations, criminal organizations, nation states, for example.

Accordingly, embodiments of the present disclosure can detect electronic system modification, e.g., tampering, as the electronic system exists in place, or as the electronic system has been received after having been shipped from another location. Additionally, embodiments of the present disclosure can include a hardware and software system that uses an applied methodology for detecting electronic systems tampering. Such embodiments can leverage a number of scanning and imaging technologies in conjunction with pattern recognition technologies. Additionally, some embodiments can include an apparatus to scan an electronic system while mounted in a rack, which can occur at a point in time after the electronic system had been received and deployed.

Referring now to FIG. 1, which depicts a block diagram of a system 100 for detecting electronic system modification, in accordance with embodiments of the present disclosure. The system 100 includes electronic system 102 and a modification detector 104. As stated previously, the electronic system 102 can include various types of electronics, such as computers, the modular subsystems of computers, and network appliances, such as, switches, routers, firewalls, load balancers, and the like. The electronic systems 102-T1, 102-T2 represent the electronic system 102 at two different points in time, T1 and T2. The time T1 can represent at a time of manufacture, when the electronic system 102 is in a predetermined, expected state. When in the predetermined, expected state, the electronic system 102 operates as designed. The time T2 can represent the time of use for the electronic system 102. However, it is possible that between times T1 and T2, a malicious actor has tampered with the electronic system 102, potentially to gain privileged access to, or to steal, private data from the electronic system 102. Accordingly, before using the electronic system 102, the modification detector 104 can determine if the electronic system 102 has been damaged or tampered with.

According to embodiments of the present disclosure, the modification detector 104 generates scans 106 of the electronic system 102 at times T1 and T2. The scans 106 can include scans or images generated in various electromagnetic wavelengths, including, radio wave, light detection and ranging (lidar), photographic, e.g., visible, thermal, and the like. According to embodiments of the present disclosure, the modification detector 104 compares the scans 106 of the electronic systems 102-T1, 102-T2 to determine if a potentially malicious actor has modified the electronic system 102 between times T1 and T2. Accordingly, the modification detector 104 can generate detection results 108. The detection results 108 can indicate whether the electronic system 102 is altered between times T1 and T2. The detection results 108 can be a paper report, electronic report, presentation, indicator light on an electronic terminal, or the like.

The modification detector 104 can generate the scans 106 by measuring electromagnetic, radio, and thermal radiation of the electronic systems 102-T1, 102-T2 while the electronic systems 102-T1, 102-T2 are powered on. Further, the modification detector 104 can measure this radiation while the electronic systems 102-T1, 102-T2 are executing a prescribed suite of routines. This suite of routines can be configured to energize predetermined components of the electronic system 102 in a predetermined, repeatable sequence, and to a measured extent. Energizing predetermined components to a measured extent can mean that the collection of components that are energized may not be energized to the same degree in which they would be energized in their expected run state. In some embodiments, it can be advantageous to energize the components to a limited degree, or to varying degrees over a period of time. Accordingly, the modification detector 104 can generate multiple scans 106 in a specific range of electromagnetic frequencies while the electronic systems 102-T1, 102-T2 are executing the prescribed suite of routines to verify that the components of the electronic systems 102-T1, 102-T2 energize in the predetermined sequence.

Additionally, the modification detector 104 can generate multiple scans 106 in the same range of electromagnetic frequencies by capturing images or scanning the electronic systems 102-T1, 102-T2 from multiple angles. According to embodiments of the present disclosure, the modification detector 104 generates the scans in an environment and following a predetermined methodology that can be replicated at multiple locations using multiple modification detectors 104 and/or users of the modification detectors 104.

According to embodiments of the present disclosure, the modification detector 104 can map spatial and other relationships between energetic and visual points of relief. This process can be considered akin to facial recognition, satellite imaging, and cell nucleus 3-dimensional (3D) scanning processes. Further, the chain of custody for handling the scans 106 can leverage Public-Key Infrastructure to ensure the integrity of the scans 106. The mappings rendered by these processes can represent the identity and state of the electronic systems 102-T1, 102-T2. Any changes in subsequent scan mappings between the scans 106 generated for the electronic system 102-T1 and the scans 106 generated for the electronic system 102-T2 can indicate that the electronic system 102 is in an altered state and therefore potentially subject to damage or tampering.

In some embodiments, a scanning or imaging device may generate the scans 106 for the electronic system 102-T1 and/or 102-T2. In such an embodiment, the modification detector 104 can generate the detection results 108 by performing the comparative analysis of the scans 106.

Figure 2A:
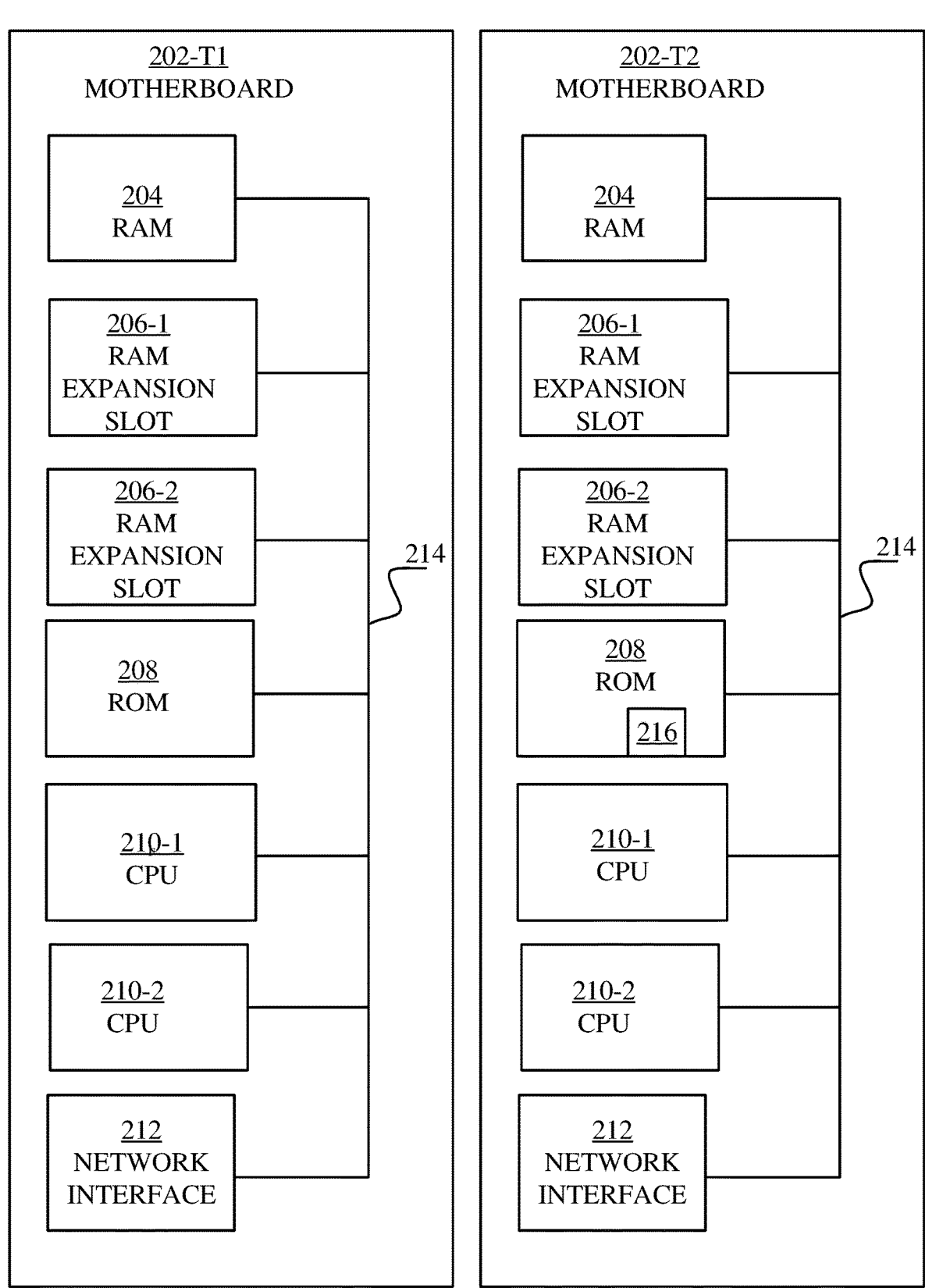
FIG. 2A depicts a block diagram of example motherboards, in accordance with embodiments of the present disclosure.

Referring now to FIG. 2A, which depicts a block diagram of example motherboards 202-T1, 202-T2, in accordance with embodiments of the present disclosure. The motherboards 202-T1, 202-T2 represent an example of an electronic system 202 at two different points in time, T1 and T2. The motherboard 202 can be a component of a computer system that includes processors, power, memory and other hardware. Motherboards vary as computers vary, with their varying combinations of technology. In this example, the motherboard 202 includes random access memory (RAM) 204, RAM expansion slots 206-1, 206-2, read only memory 208, central processing units (CPUS) 210-1, 210-2, and network interface 212, all of which are connected over bus 214.

The RAM 204 provides a relatively fast memory that the CPUS 210-1, 210-2 generally use to execute computer application instructions. The RAM expansion slots 206-1, 206-2 can enable the owner of the motherboard 202 to increase the amount of total RAM available to the CPUS 210-1, 210-2, and thus improve the processing performance without buying a new motherboard.

The ROM 208 provides memory storage that cannot be overwritten. Useful computer applications for starting a computer, such as the basic input and output system (BIOS), can be stored in the ROM 208. The network interface 212 can provide network connectivity for the computer using the motherboard 202. The network interface 212 can provide wired or wireless connectivity to a local area network, or wide area network, such as the Internet.

As the motherboard 202 can be damaged or tampered with between times T1 and T2, the motherboards 202-T1, 202-T2 can represent two different motherboards, each at different points in time. According to embodiments of the present disclosure, the modification detector 104 can generate scans 106 of the motherboard 202-T1, e.g., after manufacture while still in the chain of custody of the manufacturer. The scans can detect various ranges of electromagnetic radiation, some of which can be generated while the motherboard 202-T1 is powered and operating. Other scans can be generated when the motherboard 202-T1 is not powered or operating.

The motherboard 202-T2 represents the motherboard 202 at time T2. The time T2 can be upon receipt by a retailer or end user. According to embodiments of the present disclosure, the retailer, or end user, can use the modification detector 104 to determine if the motherboard 202 still operates as configured at time T1, or if the motherboard has been damaged or tampered with. In this example, the motherboard 202 is tampered with between time T1 and T2. More specifically, the ROM 208 in the motherboard 202-T2 includes an anomaly 216. The anomaly 216 can possibly be a spy chip plugged into the ROM 208. In some embodiments, the anomaly 216 can be directly connected to bus 214. The hardware of electronic systems, such as the motherboard 202, contains complex and miniaturized technologies. Due to the small scale of some technologies, it may not be possible to detect anomalies, such as the anomaly 216, with the naked eye. Accordingly, embodiments of the present disclosure can generate photographs of the motherboard 202 using photography in resolutions powerful enough to distinguish differences in electronic systems that have been altered.

Thus, the modification detector 104 or some other imaging device can generate photographs of the motherboards 202-T1, 202-T2. The modification detector 104 can thus compare the photographs using subtractive filtering, for example, as a method of overlaying two images that highlights the difference between the two images. Recording a photograph as a digital image can mean recording the color of every dot, e.g., pixel, in the photograph. Pixels are also referred to herein as data points. Thus, the modification detector 104 can compare each data point of the image of the motherboard 202-T1 to each corresponding data point in the image of the motherboard 202-T2.

In subtractive filtering, an arithmetic comparative function is applied to arrays of pixels in the photographs. The arrays of pixels can represent specific regions of the motherboards 202-T1, 202-T2 that are analyzed to determine if the motherboard 202-T2 is different from the motherboard 202-T1. The arithmetic, comparative function can be applied iteratively for each pair of corresponding data points of the scans being compared. It is noted that subtractive filtering is merely one technique for comparing overlaid images. Overlaid images can be images of the same dimensions that can be compared pixel by pixel.

Figure 2B:
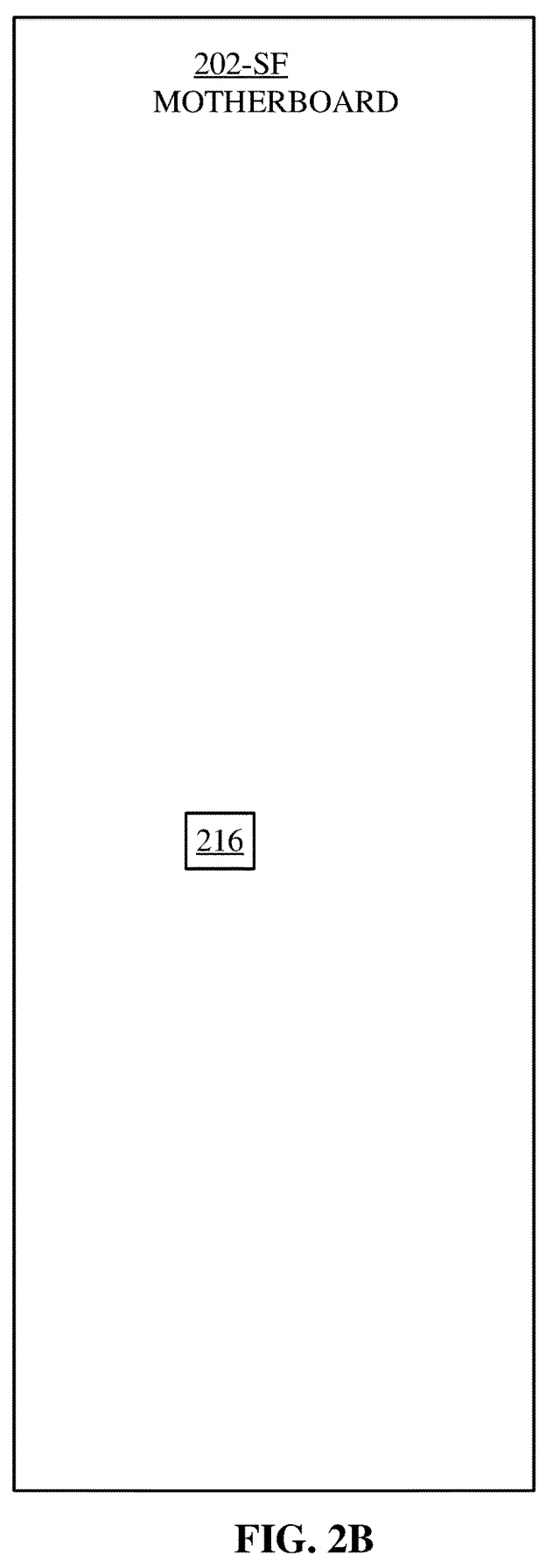

Referring now to FIG. 2B, which is a block diagram of an example subtractive filtered motherboard 202-SF, in accordance with embodiments of the present disclosure. The motherboard 202-SF represents a rendition of a difference between the scan of motherboard 202 at time T1 (motherboard 202-T1) and the scan of motherboard 202 at time T2 (motherboard 202-T2) after subtractive filtering. According to embodiments of the present disclosure, the modification detector 104 can apply an arithmetic comparative function to image data point arrays of two scans that are expected to be the same. Each array can be the same size and sampled from the same regions on each of the scans 106 being compared. Thus, the modification detector 104 can compare each pair of corresponding data points of two different scans 106 and identify which, if any, of the data points are not the same in both scans 106.

For example, the motherboards 202-T1, 202-T2 can represent two scans 106 that are expected to be the same. The motherboards 202-T1, 202-T2 can be mapped to the same coordinate systems, each system having X and Y axes of identical scale. Thus, each data point of the motherboards 202-T1, 202-T2 can be represented as T1(X,Y) and T2(X, Y). Further, the modification detector 104 can subtract data point value T1(X,Y) from data point value T2(X,Y) to produce data point value SF(X,Y). Where there are relatively small or no differences between the data point values of T1(X,Y) and T2(X,Y), the data point value for SF(X,Y) can be near zero or zero. However, where there is a substantial difference between the data point values of T1(X,Y) and T2(X,Y), the data point value for SF(X,Y) can have a more significant, non-zero value. Accordingly, the modification detector 104 can apply this subtractive function for all corresponding T1(X,Y) and T2(X,Y) data points. The modification detector 104 can also factor image jitter, image aspect distortion, and image data point value range deviation probabilities into the subtractive filtering techniques.

The motherboard 202-SF reveals the anomaly 216 described with respect to FIG. 2A. By applying subtractive filtering to the motherboards 202-T1, 202-T2, the modification detector 104 can generate the image represented by the motherboard 202-SF. As all data points T1(X,Y) and T2(X,Y) may be the same except for the region containing the anomaly 216, the motherboard 202-SF, generated by applying subtractive filtering to the motherboards 202-T1 and 202-T2, can merely include a representation of the anomaly 216.

A data point set for 202-SF having a substantial set of substantially non-zero value elements can indicate a meaningful difference between 202-T1 and 202-T2, indicating that the motherboard 202 could have been subject to modification. This can be determined, for example, by having a threshold difference at a data point and/or a threshold number of adjacent or proximate difference data points with substantially non-zero values to indicate whether there is an anomaly present in rendition ["motherboard"] 202-SF. Where the data sets are derived from lidar imaging representing three-dimensional (3D) data, data point values will map to a 3D coordinate system having X, Y, and Z axes (not shown). In the case of 3D data set comparisons, the subtractive function can be data point value T1(X,Y,Z) minus data point value T2(X,Y,Z) to produce data point value SF(X,Y,Z).

Figure 3:
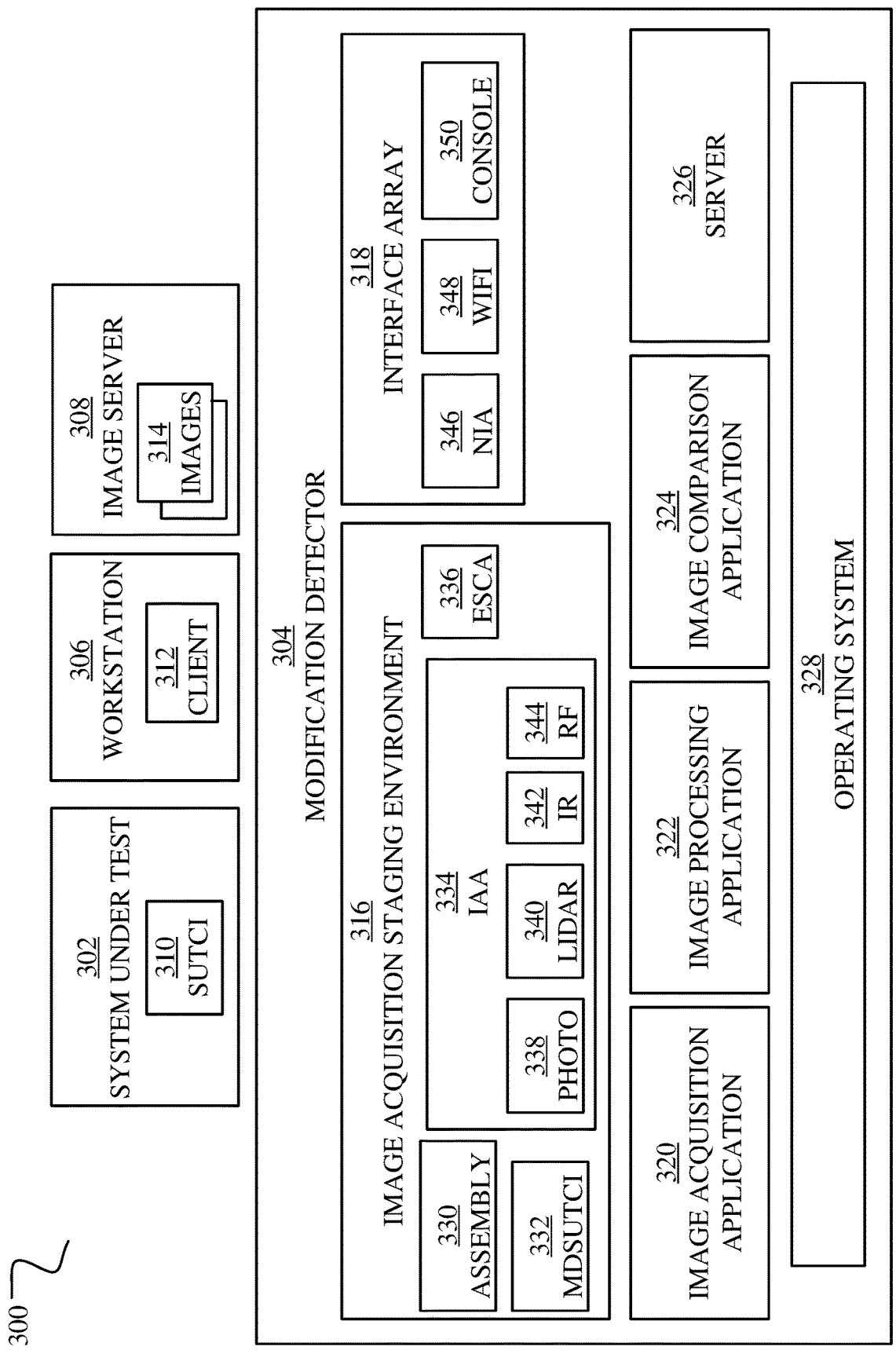
FIG. 3 depicts a block diagram of an example system for detecting electronic system modification, in accordance with embodiments of the present disclosure.

Referring now to FIG. 3, which depicts a block diagram of an example system 300 for detecting electronic system modification, in accordance with embodiments of the present disclosure. The system 300 can include a system under test 302, modification detector 304, workstation 306, and image server 308. The system under test 302 and the modification detector 304 can be an electronic system and a modification detector, respectively, such as the electronic system 102 and modification detector 104, described with respect to FIG. 1. Referring back to FIG. 3, the system under test 302 can include a system under test control interface (SUTCI) 310. The SUTCI 310 can be a port or other electronic system connection for the modification detector 304 and the workstation 306 to operate the system under test 302. Operating can involve powering on and off the system under test 302. Operating can also involve causing the system under test 302 to execute a prescribed set of routines, such as described with respect to FIG. 1.

The workstation 306 can be a desktop computer, laptop, tablet, smartphone, or any other computing device. The workstation 306 can include a client 312. The client 312 can be a computer application that can operate the system under test 302 and the modification detector 304, specifically to initiate modification detection, scanning, and the other techniques described with respect to the electronic system 102 and modification detector 104 herein. The client 312 can also present results of the modification detection and scanning.

The image server 308 can be a storage server, or any other computing device configured to store data, and provide stored data upon authorized request. In this example, the image server 308 includes images 314, which can be images of the system under test 302 at different points in time (e.g., T1 and T2) using different types of images (e.g., lidar and infrared). The images 314 can be similar to the scans 106 described with respect to FIG. 1.

The modification detector 304 can include an image acquisition staging environment 316, an interface array 318, image acquisition application 320, image processing application 322, image comparison application 324, a server 326, and an operating system 328. The image acquisition staging environment 316 includes an SUT staging assembly 330, modification detector system under test control interface (MDSUTCI) 332, image acquisition assembly (IAA) 334, and environment sensor and controller assembly 336. The IAA 334 includes equipment configured to acquire images of the system under test 302. The IAA 334 can include image acquisition equipment for photographic (photo) 338, lidar 340, infrared (IR) 342, and radio frequency (RF) 344 images. The SUT staging assembly 330 can be an apparatus configured to hold, in a prescribed and repeatable way, the electronic system 102 while being scanned The interface array 318 can include various types of connections for communication with the modification detector 304. For example, the interface array 318 includes a network interface assembly (NIA) 346, Wi-Fi interface assembly (Wi-Fi) 348, and console interface assembly (console) 350.

According to embodiments of the present disclosure, the system 300 can be implemented through the deployment and provisioning of the modification detector 304, and peripheral components: the workstation 306 and image server 308. The system 300 can generate a baseline profile of the system under test 302, and a field profile of the system under test 302 to make it possible to identify any differences between the system under test 302 at the manufacturing facility and in the field. The baseline and field profiles can include the images 314 of the system under test 302 that are generated at the manufacturing facility and in the field, respectively.

The workstation 306 and image server 308 can be connected to a network (not shown), such as a private local network. For the manufacturer of the system under test 302, the image server 308 can be connected to a demilitarized zone (DMZ) of the local network. The DMZ, also referred to as a perimeter network, can be a security implementation to firewall the local network from an untrusted network, such as the Internet.

Because the system under test 302 can be scanned, or imaged, at different physical locations, the system 300 can include multiple modification detectors 304, including one at a site of the manufacturer, and one at the site of the deployment of the system under test 302. According to embodiments of the present disclosure, a manufacturer of the system under test 302 can place the system under test 302 in the modification detector 304, which can generate images 314 of the system under test 302 in multiple dimensions and wavelengths.

Additionally, the modification detector 304 can upload the images 314 and image file hashes to the image server 308. The image file hash can be an encrypted form of the image that can be used to determine the authenticity of the images 314. The image file hashes may be generated using a public-key infrastructure. Accordingly, when the system under test 302 is tested in the field, the baseline images 314 can be retrieved from the image server 308 for comparison.

According to some embodiments, the modification detector 304 can set the NIA 346 IP address, netmask, and gateway via a portable computing device connected to the console 350. Further, the NIA 346 can be connected to a private network. In this way, it can be possible to update computer applications on the modification detector 304. More specifically, the modification detector 304 may search a local network or the Internet for updates to the image acquisition application 320, image processing application 322, image comparison application 324, server 326, and operating system 328. If updates are found, the modification detector 304 can update these applications 320, 322, 324, 326 and/or operating system 328.

To test the system under test 302 in the field, the system under test 302 can be physically loaded onto the modification detector 304. Additionally, the controller interfaces can be connected. More specifically, the SUTCI 310 can be connected to the MDSUTCI 332. This connection may be useful for radio frequency and infrared imaging. The radio frequency and infrared images can be generated while the system under test 302 is running a predetermined suite of routines. The SUTCI 310 and MDSUTCI 332 can be used to direct the system under test 302 to power on and/or execute these predetermined routines, and to cause the performance of the RF and IR scans in coordination with the routine execution(s).

In some embodiments, an end user can log on to the modification detector 304 from the workstation 306 by using the client 312. Further, the end user can launch the image acquisition application 320. Accordingly, the image acquisition application 320 can be used to launch the predetermined suite of routines for IR and RF image generation. More specifically, via the connection between MDSUTCI 332 and SUTCI 310, the modification detector 304 can enable power to the system under test 302, and launch the predetermined suite of routines, also referred to herein as system under test self-test processes.

Further, the image acquisition application 320 can be used to position the system under test 302. In some embodiments, by leveraging data presets or data acquired from photographic assembly 338 and/or lidar assembly 340, the image acquisition application 320 can be used to manipulate the spatial orientation of staging assembly 330 to yield a predetermined set of spatial orientations of the system under test 302 relative to the image acquisition staging environment 316. The data presets can be sourced from the manufacturer of the system under test 302, e.g., the modification detector 304 at the site of the manufacturer, as image metadata. Further, these data presets can be leveraged by the modification detector 304 at the site of deployment.

Additionally, the image acquisition application 320 can capture image acquisition station staging assembly spatial orientation metadata. More specifically, for each desired spatial orientation of the staging assembly 330, the image acquisition application 320 can capture data depicting the spatial orientation of the staging assembly 330 relative to the image acquisition staging environment 316.

The image acquisition application 320 can also position the image acquisition assembly 334 for each acquired 314 image. More specifically, by leveraging data presets or data acquired from photographic assembly 338 and/or lidargraphic assembly 340, the image acquisition application 320 can manipulate spatial orientation of image acquisition assembly 334 to yield a desired sequential set of spatial orientations of each of the photo 338, lidar 340, IR 342, and RF 344 relative to the system under test 302.

Further, the image acquisition application 320 can capture image acquisition assembly spatial orientation metadata. In other words, for each of the photo 338, lidar 340, IR 342, and RF 344 the spatial orientation of each image acquisition assembly 334 can be captured by the image acquisition application 320. Thereby, data depicting the spatial orientation of the image acquisition assembly 334 relative to the SUT 302 can be captured.

Additionally, the image acquisition application 320 can acquire an image set for the system under test 302. The image set can include a collection of different types of images taken at the same time; one type of image taken at different times; or some combination of the above. For each specified spatial orientation of each assembly described above, the image acquisition application 320 can execute an image acquisition routine of image acquisition application 320 to acquire an image 314 of the system under test 302. Further, for each image 314, the image acquisition application 320 can capture image acquisition station staging assembly area environmental metadata. The ESCA 336 can capture data representing the environmental data present in the image acquisition staging environment 316, including ambient lighting, temperature, humidity, and altitude.

The writing and reading of image metadata can provide a method to produce data presets and replicate, or account for, image acquisition assembly positioning and environmental parameters observed at the manufacturer's facility versus those at the site of deployment, for example, the modification detector 304 located at the Data Center (not shown) where the system under test 302 is deployed.

Once acquired, the images 314 may be processed to facilitate comparison of the baseline and field profiles. More specifically, the image processing application 322 can embed post-acquisition image processing for each image 314. Embedding post-acquisition image processing can include embedding watermarks, alignment markers, and image data point scale references.

Further, the image processing application 322 can append associated metadata. In other words, for each image 314 acquired, the image processing application 322 can append correlating metadata, such as the spatial relationships and positions described above. Additionally, the image processing application 322 can generate an image file hash. The image file hash can be an encrypted form of the image that can be used to determine the authenticity of the images 314. With regard to the modification detector 304 at the manufacturer's facility, the image processing application 322 can also upload the images 314 and hashes. More specifically, the image processing application 322 can transfer each image 314 and associated hash to the image server 308 via the server 326 and NIA 346.

Once the system under test 302 has been received in the field, e.g., at the site of deployment, the modification detector 304 can be used to determine if the system under test 302 is modified. Thus, using the modification detector 304 at the site of deployment, the image acquisition application 320 can retrieve the baseline profile images of the system under test 302 (and their associated hashes) from the image server 308 via the NIA 346.

Further, the image acquisition application 320 can verify the image integrity. For example, the image acquisition application 320 can generate a hash from the retrieved images 314 and compare the generated hash to the hash retrieved from the image server 308. If the hashes do not match, the images 314 may be corrupted. Accordingly, such images 314 may not be used for comparison. However, if the hashes do match, the modification detector 304 can proceed to attempt to identify differences of the images 314 captured at the manufacturing facility with the images 314 captured of the system under test 302 at the site of deployment.

More specifically, via the workstation 306, the client 312 can launch the image comparison application 324. Herein, the baseline profile images refer to images 314 that are acquired via the modification detector 304 deployed at the manufacturer's facility and uploaded to the image server 308. In contrast, the field profile images refer to images 314 acquired via the modification detector 304 at the site of deployment, a data center, for example.

The image comparison application 324 can pair the baseline profile images with the field profile images based on embedded metadata captured by the image acquisition application 320. The embedded metadata can include an image type, spatial orientation data, and photo 338, lidar 340, IR 342, and RF 344 positioning data of each image. For each paired image set, the image comparison application 324 can launch a graphic relief analysis of each image. Similar to fingerprint scanning or facial recognition analysis, the image comparison application 324 can render a mapping of graphic relief and edge detection over each image in the image set. The image comparison application 324 can thus compare the relief mappings of each image to determine a calculated probability that one image's mapping is the same as the other.

Further, the image comparison application 324 can perform a subtractive filtering analysis. In the subtractive filtering analysis, the image comparison application 324 aligns and overlays the baseline profile image on top of the field profile image. Pixel values from the baseline profile image can be subtracted from the pixel values of the field profile image. Near zero-value results or zero-value results can indicate little or no difference between the pixels at that point on each of the images. However, substantially non-zero-value results can indicate that a difference exists between the pixels at that point on each image. A substantial collection of substantially non-zero results can indicate one image has a likelihood of being different from the other.

Figure 4:
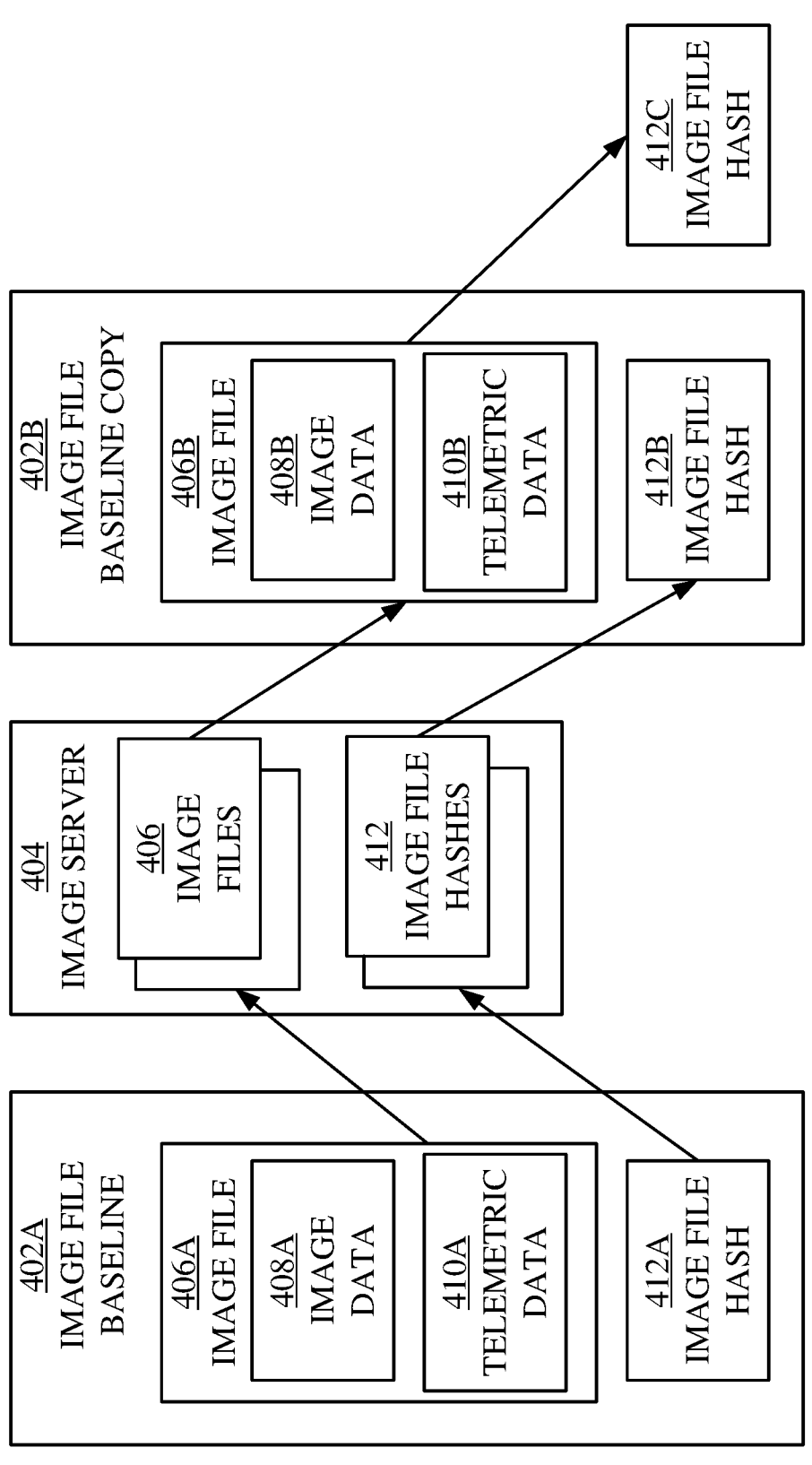
FIG. 4 depicts a block diagram of an image file baseline, image server, image file baseline copy, and image file hash, in accordance with embodiments of the present disclosure.

FIG. 4 depicts a block diagram of an image file baseline 402A, image server 404, image file baseline copy 402B, and image file hash 412C, in accordance with embodiments of the present disclosure. The image file baseline 402A can be an original image file generated by a modification detector at the electronic system's point of manufacturer or origin, such as the modification detector 304. The image file baseline 402A can include an image file 406A. The image file 406A can include image file data 408A and telemetric data 410A. The image file data 408A can include a photographic, IR, RF, or Lidar depiction of the electronic system under test as acquired by a modification detector sensor.

The telemetric data 410A can include data that describes the run state of the modification detector at the point in time when the image data 408A is acquired. For example, the telemetric data 410A can include data describing the sensor type, the position and orientation of the sensor in relation to the electronic system under test, and general ambient conditions of the staging environment within which the image is acquired. The ambient conditions can include, for example, light, temperature, humidity levels, and the like.

Additionally, the image file baseline 402A can include an image file hash 412A. The image file hash 412A can be a file checksum hash of the image file 406A that is generated by an image processing application, such as the image processing application 322. According to embodiments of the present disclosure, the image file hash 412A can be used to verify the integrity of the image file 406A.

The image file baseline copy 402B can be a copy of the image file baseline 402A as downloaded from the image server 404 to a modification detector in the field, such as the modification detector 304. The image file baseline copy 402B can include an image file 406B, which can be a copy of the image file 406A. Similar to the image file 406A, the image file 406B can include image data 408B and telemetric data 410B. The image data 408B can be a copy of the original image data 408A. Further, the telemetric data 410B can be a copy of the original telemetric data 410A.

According to embodiments of the present disclosure, the modification detector 304 in the field can use the telemetric data 410B to automatically recreate conditions for image generation. The recreated conditions can include the sensor selection and the orientation of a system under test, such as the system under test 302. Additionally, the modification detector 304 in the field can use the telemetric data 410B to account for differences in conditions under which the image file 406A is acquired by the modification detector 304 at the electronic system's point of manufacture or origin.

Additionally, the image file baseline copy 402B can include an image file hash 412B. The image file hash 412B can be a copy of the image file hash 412A generated by the image processing application 322 of the modification detector 304 at the electronic system's point of manufacture or origin. The image file hash 412B can be used to verify the authenticity and integrity of the image file 406B.

The image file hash 412C can be a file checksum hash of the image file 406B generated by an image comparison application, such as the image comparison application 324 running on the modification detector 304 in the field. The image file hash 412C can be compared to the image file hash 412B to confirm the authenticity and integrity of image file 406B.

The following describes a technique to, in the field, replicate or account for the conditions under which an image of the system under test is acquired at its place of manufacture or point of origin. According to embodiments of the present disclosure, the image file baseline 402A can be uploaded from a modification detector 304 at an electronic system's point of manufacture (not shown) to the image server 404 as the image file 406 and image file hash 412. Accordingly, the image file 406 and image file hash 412 can be downloaded to a modification detector 304 in the field (not shown) as the image file baseline copy 402B. Software in the field can run a hash generating algorithm against the image file 406B to create image file hash 412C, which is compared to the image file hash 412B to confirm the integrity of image file 406B. If the image file hash 412C does not match the image file hash 412B, the modification detection process is halted, as image file 406B is thus determined to be corrupted. However, if the image file hash 412C is the same as the image file hash 412B, the modification detection process continues. Accordingly, the telemetric data 410B can be input into an image acquisition application, such as the image acquisition application 320, running on the field modification detector (not shown) and cause the field modification detector to select and position a sensor (not shown) and adjust lighting and temperature in a modification detector image acquisition staging environment, such as the modification detector image acquisition staging environment 316. In this way, the field modification detector can attempt to recreate the ambient conditions under which the image file 406A is acquired. Telemetric data 410B can also be input into field modification detector image comparison software, such as the image comparison application 324. In this way, the image comparison application 324 can compensate for any differences between the ambient conditions under which the image data 408A, 408B are acquired. Such compensation can account for differences, such as variances in image alignment, zoom, lighting, and environmental variables. The environmental variables can include, for example, the staging environment temperature, which can contribute to differences in IR imaging.

Figure 5:
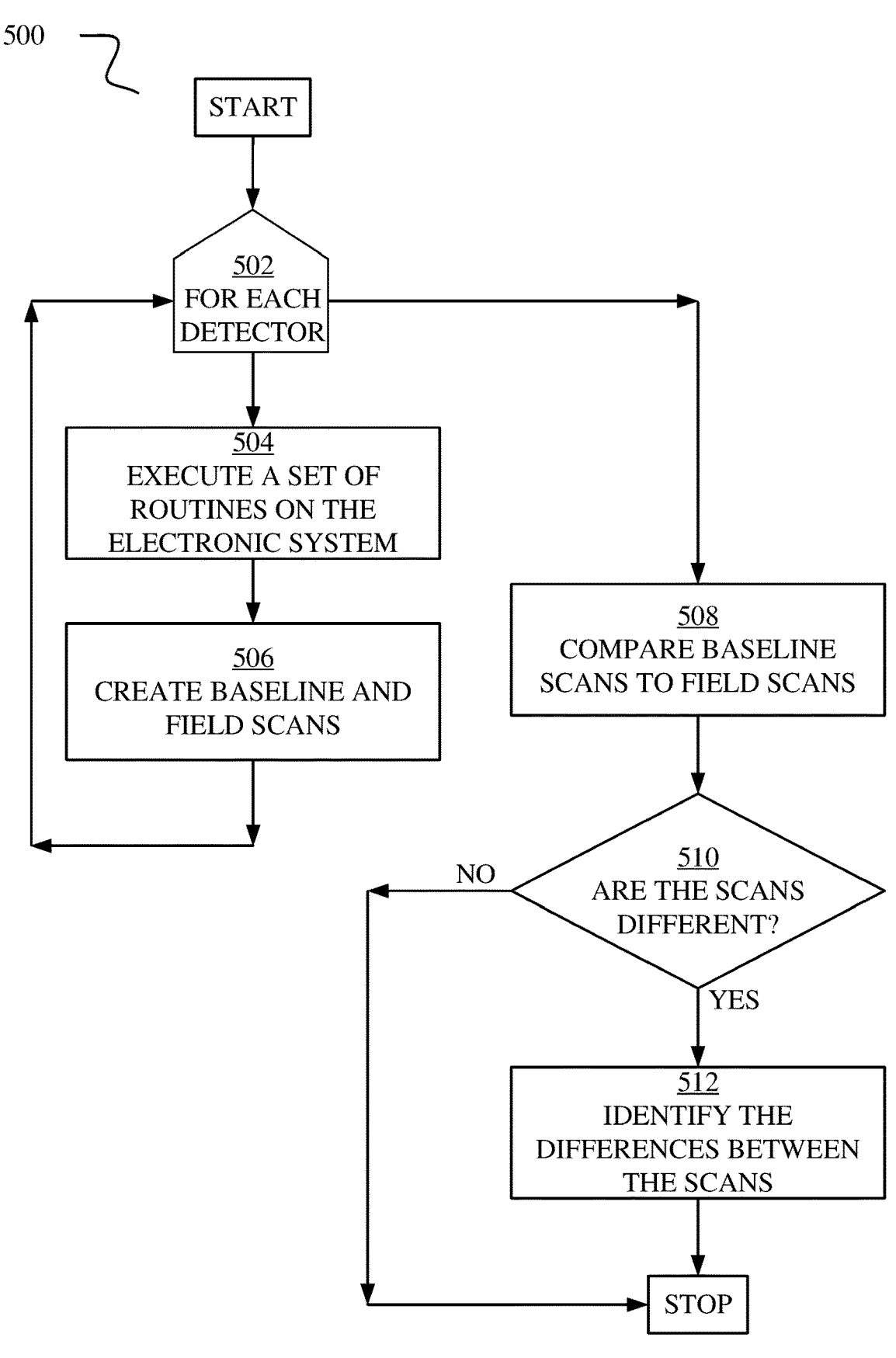
FIG. 5 depicts a flowchart of a method for detecting electronic system modification, in accordance with embodiments of the present disclosure.

Referring now to FIG. 5, which depicts a flowchart of an example method 500 for detecting electronic system modification, in accordance with embodiments of the present disclosure. The method 500 can be performed by a modification detector on an electronic system, such as the modification detector 104 and electronic system 102 described with respect to FIG. 1. Referring back to FIG. 5, the modification detector 104 can perform the blocks 502 through 506 for each modification detector 104. For example, both the manufacturer of the electronic system 102 and the purchaser of the electronic system 102 can have a modification detector 104. At block 504, the modification detector 104 can execute a set of routines on the electronic system 102. These routines can include a suite of routines that are configured to energize predetermined components of the electronic system 102 in a predetermined and repeatable sequence.

At block 506, the modification detector 104 can create baseline or field scans. The modification detector 104 at the manufacturer's site can create the baseline scans, and the modification detector 104 at the purchaser's site can create the field scans. Each of the baseline and field scans can be generated by measuring electromagnetic radiation emitted by the electronic system 102 during the execution of the set of routines. More specifically, the modification detector 104 can measure electromagnetic radiation emitted in the radio frequency and infrared spectrums. Further, the modification detector 104 can generate lidar scans and image captures in the visible light spectrum for the baseline and field scans. The modification detector 104 may or may not power on or operate the electronic system 102 for the lidar scans and image captures.

At block 508, the modification detector 104 at the purchaser's site can compare the baseline scans to the field scans. The comparison can include a relief map and/or a subtractive filtering technique.

At block 510, the modification detector 104 can determine whether the baseline and field scans are different. The relief map and subtractive filtering techniques can identify specific pixels of the scans and images that differ between the baseline and field scans. According to embodiments of the present disclosure, the modification detector 104 can use a predetermined threshold for the amount of difference between the baseline and field scans to determine whether the difference could indicate modification. The predetermined threshold can be specified in the number of pixels that differ between baseline and field scans. Additionally, the predetermined threshold can be specified in the amount of difference between each data point value of the baseline and field scans. If the baseline and field scans are not different, the method 500 can stop. If the baseline and field scans are different, the method 500 can flow to block 512.

At block 512, the modification detector 104 can identify the differences between the baseline scans and the field scans. If the baseline and field scans are different, the modification detector 104 can generate an alert stating the electronic system 102 is modified. As stated previously, the specific pixels, or data points, of the scans that differ can be identified. Accordingly, the modification detector 104 can also present images of the differing pixels on a display device as an image. Additionally, the modification detector 104 can present a report (such as detection results 108 in FIG. 1) that identifies each differing pixel, and the differing values.

Figure 6:
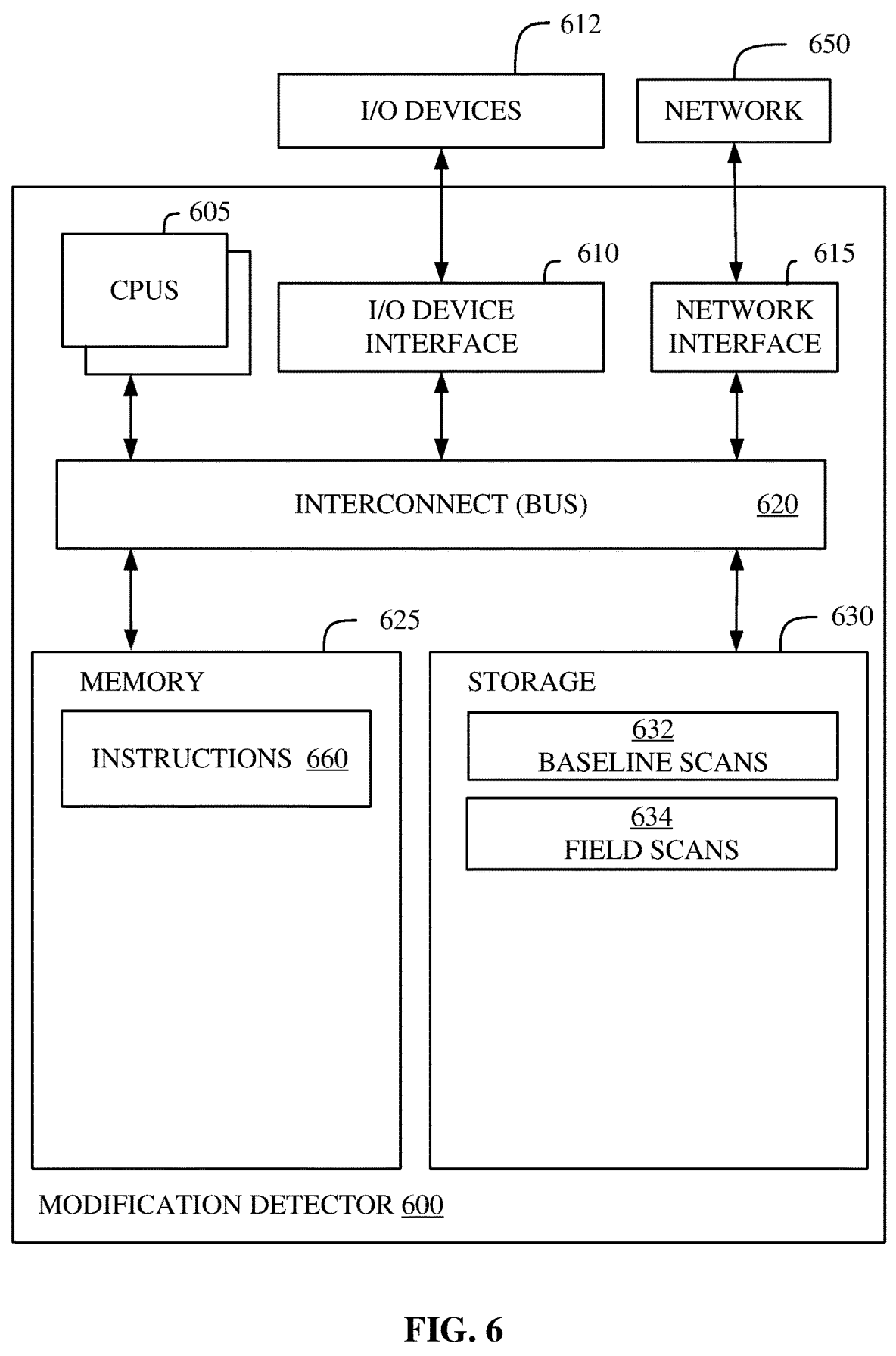

Referring now to FIG. 6, which depicts a block diagram of an example modification detector 600, in accordance with embodiments of the present disclosure. In various embodiments, the modification detector 600 can perform the method described in FIG. 5 and/or the functionality discussed in FIGS. 1-4. In some embodiments, the modification detector 600 provides instructions for the aforementioned methods and/or functionalities to a client machine such that the client machine executes the method, or a portion of the method, based on the instructions provided by the modification detector 600. In some embodiments, the modification detector 600 comprises software executing on hardware incorporated into a plurality of devices.

The modification detector 600 includes a memory 625, storage 630, an interconnect (e.g., BUS) 620, one or more CPUS 605 (also referred to as processors 605 herein), an I/O device interface 610, I/O devices 612, and a network interface 615.

Each CPU 605 retrieves and executes programming instructions stored in the memory 625 or the storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, and/or flash memory devices. Additionally, the storage 630 can include storage area-network (SAN) devices, the cloud, or other devices connected to the modification detector 600 via the I/O device interface 610 or a network 650 via the network interface 615.

In some embodiments, the memory 625 stores instructions 660 and the storage 630 stores baseline scans 632 and field scans 634. However, in various embodiments, the instructions 660, baseline scans 632 and field scans 634 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all, any of the method of FIG. 5 and/or any of the functionality discussed in FIGS. 1-4.

The baseline scans 632 and field scans 634 can include scans and/or images of an electronic system, such as the electronic system 102. The scans and/or images can include image captures, lidar scans, and scans in the infrared and radio frequency spectrums. The baseline scans 632 can be generated at a source site, such as the manufacturing facility for the electronic system 102. The field scans 634 can be generated at a facility where the electronic system 102 is received, deployed, and so on.

In various embodiments, the I/O devices 612 include an interface capable of presenting information and receiving input. For example, I/O devices 612 can present information to a user interacting with modification detector 600 and receive input from the user.

The modification detector 600 is connected to the network 650 via the network interface 615. Network 650 can comprise a physical, wireless, cellular, or different network.

In some embodiments, the modification detector 600 can be a multi-user mainframe computer system, a single-user system, or a server computer or similar device that has little or no direct user interface but receives requests from other computer systems (clients). Further, in some embodiments, the modification detector 600 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary modification detector 600. In some embodiments, however, individual components can have greater or lesser complexity than as represented in FIG. 6, components other than or in addition to those shown in FIG. 6 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
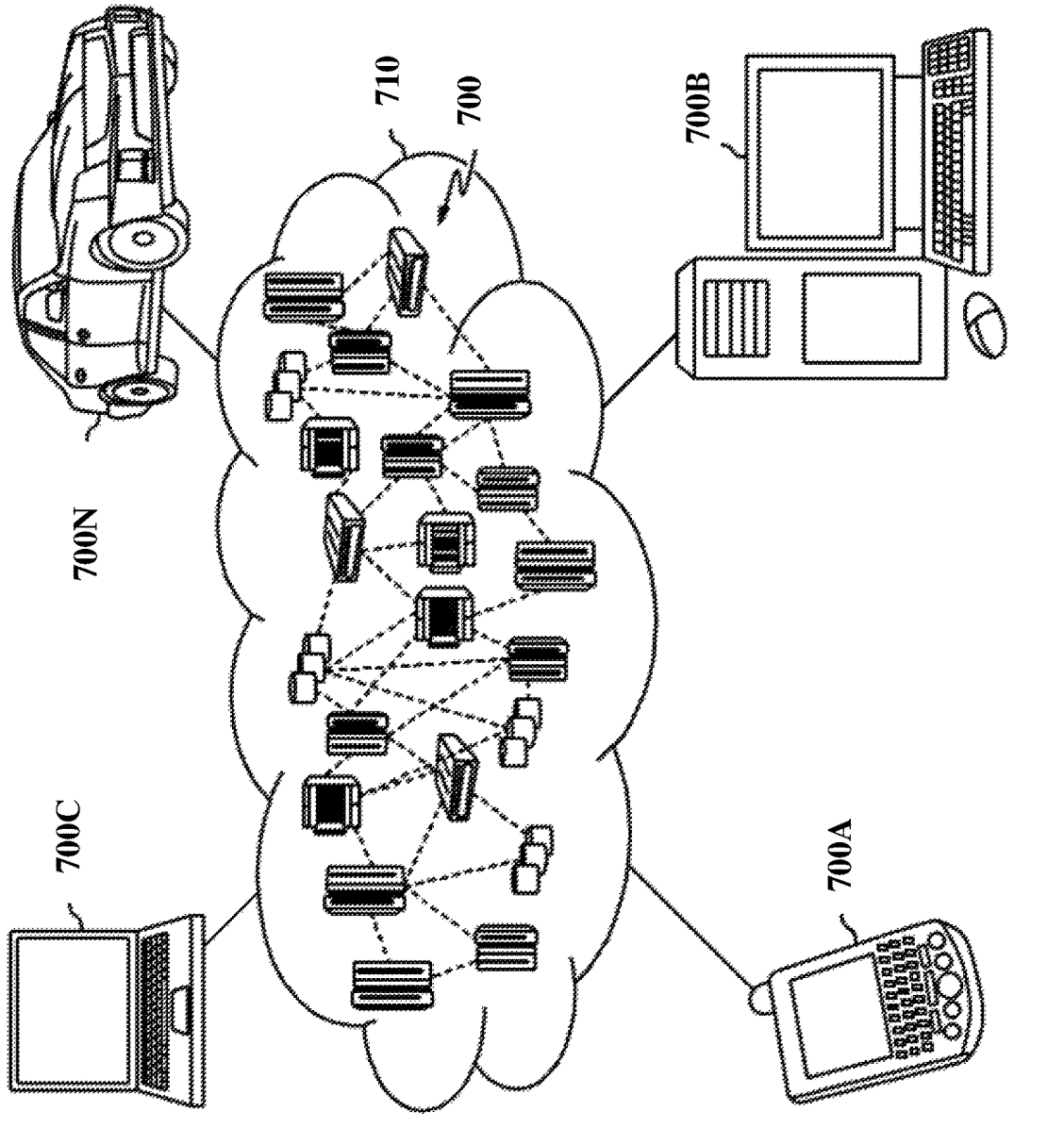
FIG. 7 depicts a cloud computing environment, according to some embodiments of the present disclosure.

Referring now to FIG. 7, which depicts a cloud computing environment 710, according to some embodiments of the present disclosure. As shown, cloud computing environment 710 includes one or more cloud computing nodes 700. The cloud computing nodes 700 can perform the method described in FIG. 5 and/or the functionality discussed in FIGS. 1-4. Additionally, cloud computing nodes 700 can communicate with local computing devices used by cloud consumers, such as, for example, personal digital assistant (PDA) or cellular telephone 700A, desktop computer 700B, laptop computer 700C, and/or automobile computer system 700N. Further, the cloud computing nodes 700 can communicate with one another. The cloud computing nodes 700 can also be grouped (not shown) physically or virtually, in one or more networks, such as Private, Community, Public, or Hybrid clouds as described hereinabove, or a combination thereof. This allows cloud computing environment 710 to offer infrastructure, platforms and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

Figure 8:
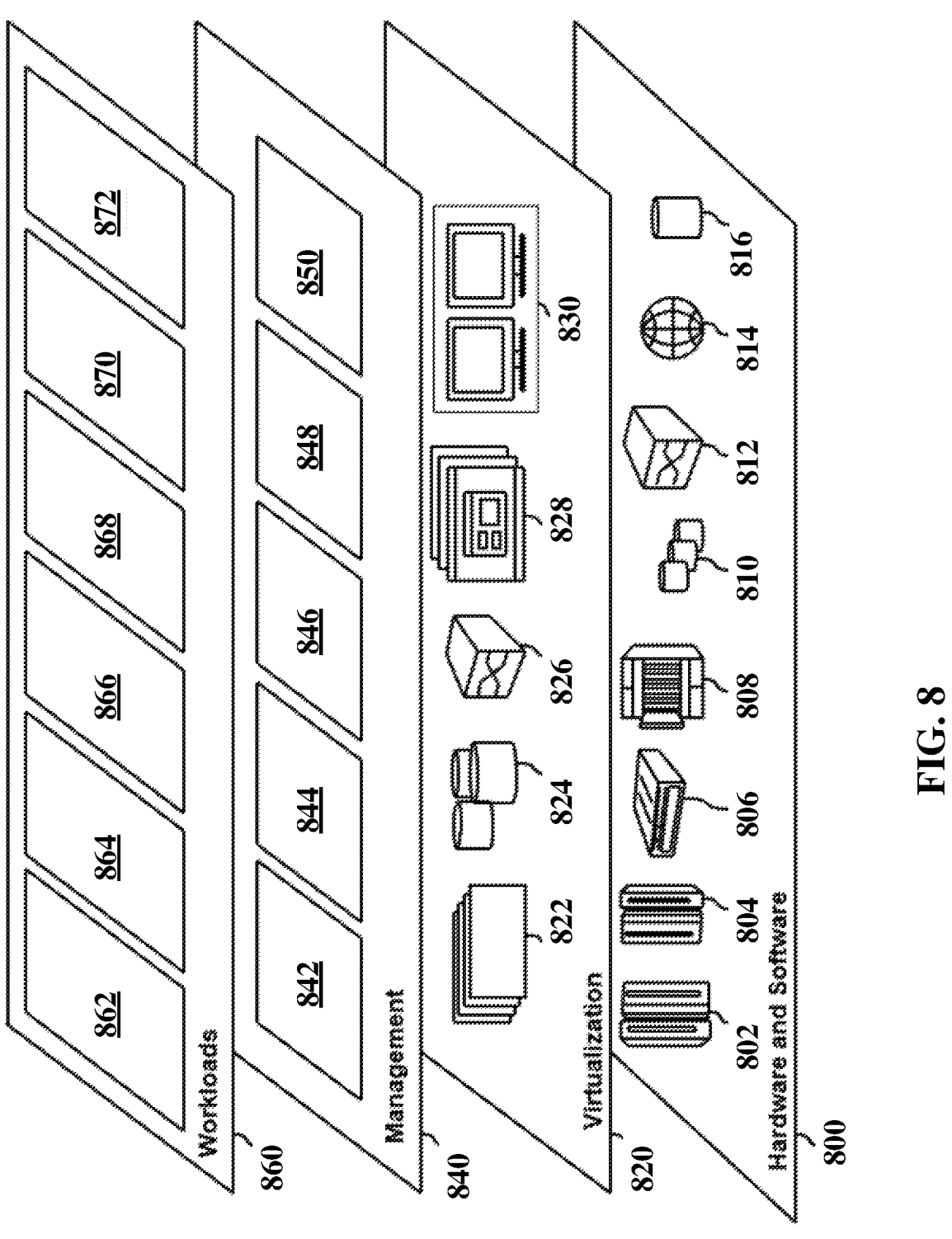
FIG. 8 depicts abstraction model layers, according to some embodiments of the present disclosure.

Referring now to FIG. 8, which depicts abstraction model layers provided by cloud computing environment 710 (FIG. 7), according to some embodiments of the present disclosure. It should be understood in advance that the components, layers, and functions shown in FIG. 8 are intended to be illustrative only and embodiments of the disclosure are not limited thereto. As depicted below, the following layers and corresponding functions are provided.

Hardware and software layer 800 includes hardware and software components. Examples of hardware components include: mainframes 802; RISC (Reduced Instruction Set Computer) architecture based servers 804; servers 806; blade servers 808; storage devices 810; and networks and networking components 812. In some embodiments, software components include network application server software 814 and database software 816.

Virtualization layer 820 provides an abstraction layer from which the following examples of virtual entities can be provided: virtual servers 822; virtual storage 824; virtual networks 826, including virtual private networks; virtual applications and operating systems 828; and virtual clients 830.

In one example, management layer 840 can provide the functions described below. Resource provisioning 842 provides dynamic procurement of computing resources and other resources that are utilized to perform tasks within the cloud computing environment. Metering and Pricing 844 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 846 provides access to the cloud computing environment for consumers and system administrators. Service level management 848 provides cloud computing resource allocation and management such that required service levels are met. Service level management 848 can allocate suitable processing power and memory to process static sensor data. Service Level Agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment can be utilized. Examples of workloads and functions which can be provided from this layer include: mapping and navigation 862; software development and lifecycle management 864; virtual classroom education delivery 866; data analytics processing 868; transaction processing 870; and modification detector 872.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

retrieving a baseline image capture of an electronic system from an image server that is connected to a perimeter network;

retrieving an image file hash for the baseline image capture from the image server;

retrieving first telemetry data from the image server, the first telemetry data including a first type of a first sensor, a first position of the first sensor, and a first orientation of the first sensor corresponding to the baseline image capture, generating a file checksum hash from the baseline image capture;

determining that the file checksum hash matches the image file hash;

causing, at a first site, the electronic system to perform a predetermined set of routines that are configured to energize a predetermined plurality of components of the electronic system to a measured extent;

generating a field image capture of the electronic system at the first site, wherein generating the field image capture of the electronic system comprises recreating a run state of the baseline image capture of the electronic system, wherein the run state comprises an ambient temperature of the baseline image capture and second telemetry data including a second type of a second sensor, a second position of the second sensor, and a second orientation of the second sensor corresponding to the field image capture, and wherein the baseline image capture is generated by:

performing an image capture of the electronic system at a second site while the predetermined set of routines is performed, wherein the first site is different from the second site; and embedding post-acquisition image processing of the image capture to facilitate comparison of the baseline image capture and the field image capture, wherein the embedded post-acquisition image processing comprises watermarks, alignment markers, and image data point scale references;

in response to determining the file checksum hash matches the image file hash, comparing the field image capture to the baseline image capture based on an identification of specific pixels in the field image capture and the baseline image capture and comparing the first telemetry data corresponding to the baseline image capture to the second telemetry data corresponding to the field image capture; and determining that the field image capture and the baseline image capture are different based on the comparison by identifying at least one difference in the specific pixels between the field image capture and the baseline image capture and the comparison of the first telemetry data with the second telemetry data, wherein the at least one difference is above a predetermined threshold.

2. The method of claim 1, wherein the field image capture and the baseline image capture comprise measures of the electronic system in a radio frequency spectrum.

3. The method of claim 1, further comprising generating an additional field scan of the electronic system comprising a photographic image capture of the electronic system.

4. The method of claim 1, further comprising generating an additional field scan of the electronic system comprising a light detection and ranging (lidar) scan of the electronic system.

5. The method of claim 1, wherein comparing the baseline image capture to the field image capture comprises performing subtractive filtering on the baseline image capture and the field image capture.

6. The method of claim 1, wherein comparing the baseline image capture to the field image capture comprises performing relief mapping on the baseline image capture and the field image capture.

7. The method of claim 1, wherein the run state further comprises an ambient lighting of the baseline image capture, ambient humidity of the baseline image capture, and ambient altitude of the baseline image capture.

8. The method of claim 1, wherein the image file hash comprises an encrypted form of the baseline image capture to determine authenticity of the baseline image capture.

9. A computer program product comprising program instructions stored on a computer readable storage medium, wherein the computer readable storage medium is not a transitory signal per se, the program instructions executable by a processor to cause the processor to perform a method comprising:

retrieving a baseline image capture of an electronic system from an image server that is connected to a perimeter network;

retrieving an image file hash for the baseline image capture from the image server;

retrieving first telemetry data from the image server, the first telemetry data including a first type of a first sensor, a first position of the first sensor, and a first orientation of the first sensor corresponding to the baseline image capture, generating a hash from the baseline image capture;

determining that the hash matches the image file hash;

causing, at a first site, the electronic system to perform a predetermined set of routines that are configured to energize a predetermined plurality of components of the electronic system to a measured extent;

generating a field image capture of the electronic system at the first site, wherein generating the field image capture of the electronic system comprises recreating a run state of the baseline image capture of the electronic system, wherein the run state comprises an ambient lighting of the baseline image capture and second telemetry data including a second type of a second sensor, a second position of the second sensor, and a second orientation of the second sensor corresponding to the field image capture, and wherein the baseline image capture is generated by:

performing an image capture of the electronic system at a second site while the predetermined set of routines is performed, wherein the first site is different from the second site; and embedding post-acquisition image processing of the image capture to facilitate comparison of the baseline image capture and the field image capture, wherein the embedded post-acquisition image processing comprises watermarks, alignment markers, and image data point scale references;

in response to determining the hash matches the image file hash, comparing the field image capture to the baseline image capture based on an identification of specific pixels in the field image capture and the baseline image capture and comparing the first telemetry data corresponding to the baseline image capture to the second telemetry data corresponding to the field image capture; and determining that the field image capture and the baseline image capture are different based on the comparison by identifying at least one difference in the specific pixels between the field image capture and the baseline image capture and the comparison of the first telemetry data with the second telemetry data, wherein the at least one difference is above a predetermined threshold.

10. The computer program product of claim 9, wherein the field image capture and the baseline image capture comprise measures of the electronic system in a radio frequency spectrum.

11. The computer program product of claim 9, the method further comprising generating an additional field scan of the electronic system comprising a photographic image capture of the electronic system.

12. The computer program product of claim 9, the method further comprising generating an additional field scan of the electronic system comprising a light detection and ranging (lidar) scan of the electronic system.

13. The computer program product of claim 9, wherein comparing the baseline image capture to the field image capture comprises performing subtractive filtering on the baseline image capture and the field image capture.

14. The computer program product of claim 9, wherein comparing the baseline image capture to the field image capture comprises performing relief mapping on the baseline image capture and the field image capture.

15. A system comprising:

a computer processing circuit; and a computer-readable storage medium storing instructions, which, when executed by the computer processing circuit, are configured to cause the computer processing circuit to perform a method comprising:

retrieving a baseline image capture of an electronic system from an image server that is connected to a perimeter network;

retrieving first telemetry data from the image server, the first telemetry data including a first type of a first sensor, a first position of the first sensor, and a first orientation of the first sensor corresponding to the baseline image capture, retrieving an image file hash for the baseline image capture from the image server;

generating a hash from the baseline image capture;

determining that the hash matches the image file hash;

causing, at a first site, the electronic system to perform a predetermined set of routines that are configured to energize a predetermined plurality of components of the electronic system to a measured extent;

generating a field image capture of the electronic system at the first site, wherein generating the field image capture of the electronic system comprises recreating a run state of the baseline image capture of the electronic system, wherein the run state comprises an ambient humidity of the baseline image capture and second telemetry data including a second type of a second sensor, a second position of the second sensor, and a second orientation of the second sensor corresponding to the field image capture, and wherein the baseline image capture is generated by:

performing an image capture of the electronic system at a second site while the predetermined set of routines is performed, wherein the first site is different from the second site; and embedding post-acquisition image processing of the image capture to facilitate comparison of the baseline image capture and the field image capture, wherein the embedded post-acquisition image processing comprises watermarks, alignment markers, and image data point scale references;

in response to determining the hash matches the image file hash, comparing the field image capture to the baseline image capture based on an identification of specific pixels in the field image capture and the baseline image capture and comparing the first telemetry data corresponding to the baseline image capture to the second telemetry data corresponding to the field image capture; and determining that the field image capture and the baseline image capture are different based on the comparison by identifying at least one difference in the specific pixels between the field image capture and the baseline image capture and the comparison of the first telemetry data with the second telemetry data, wherein the at least one difference is above a predetermined threshold.

16. The system of claim 15, wherein comparing the baseline image capture to the field image capture comprises performing subtractive filtering on the baseline image capture and the field image capture.

* * * * *